INVENTOR,
DAVID R. HADDEN JR.
BY Daniel D. Sharp
Harry M. Saragovitz
Edward J. Kelly, Herbert Berl
ATTORNEYS.

INVENTOR,
DAVID R. HADDEN JR.
BY Daniel D. Sharp
Harry M. Saragovitz
Edward J. Kelly + Herbert Berl
ATTORNEYS INVENTOR,
DAVID R. HADDEN JR.
BY Daniel D. Sharp
Harry M. Saragovitz
Edward J. Kelly & Herbert Berl
ATTORNEYS.

FIRST-IN, FIRST-OUT MEMORY

Filed June 27, 1967 8 Sheets-Sheet 4

INVENTOR,
DAVID R. HADDEN JR.
BY Daniel D. Sharp
Harry M. Saragovitz
Edward J. Kelly & Herbert Berl
ATTORNEYS.

FIRST-IN, FIRST-OUT MEMORY

Filed June 27, 1967 8 Sheets-Sheet 5

INVENTOR,
DAVID R. HADDEN JR.
BY Daniel D. Sharp
Harry M. Saragovitz
Edward J. Kelly & Herbert Berl
ATTORNEYS.

INVENTOR,
DAVID R. HADDEN JR.
BY Daniel D. Sharp
Harry M. Saragovitz
Edward J. Kelly + Herbert Berl
ATTORNEYS.

INVENTOR,
DAVID R. HADDEN JR.
BY Daniel D. Sharp
Harry M. Saragovitz
Edward J. Kelly & Herbert Berl
ATTORNEYS.

FIRST-IN, FIRST-OUT MEMORY

Filed June 27, 1967 8 Sheets-Sheet 8

INVENTOR,
DAVID R. HADDEN JR.
BY Daniel D. Sharp
Harry M. Saragovitz
Edward J. Kelly & Herbert Berl
ATTORNEYS.

United States Patent Office 3,553,661
Patented Jan. 5, 1971

3,553,661
FIRST-IN, FIRST-OUT MEMORY

David R. Hadden, Jr., Eatontown, N.J., assignor to the United States of America as represented by the Secretary of the Army Filed June 27, 1967, Ser. No. 649,364
Int. Cl. G11c *11/14, 7/00, 19/00*
U.S. Cl. 340—174 13 Claims

ABSTRACT OF THE DISCLOSURE

A first-in, first-out storage device in which the first-in, first-out function is performed by writing information in the form of a magnetic domain into an unknown location in a data register of the magnetic film type under the influence of a marker magnetic domain disposed in a contiguous register.

BACKGROUND OF THE INVENTION

In the asynchronous transfer of data in the digital communication field, data buffer memories of the first-in, first-out type are useful. Such memories accomplish the task of handling data in the order in which it is received.

Prior first-in, first-out emories generally have been random access devices in which one must keep track of the location in which the information is to be written and also the location in the memory from which that information is to be read. In order for the random access to function as a first-in, first-out memory so as to permit the random access memory to handle data sequentially (first-in, first-out operation), considerable extra circuitry must be added.

The memory of the invention, on the other hand, includes a pair of contiguous shift registers, which inherently are characterized by sequential access, positioned back-to-back. One of these registers contains a magnetic marker domain which is movable along the register in response to properly applied magnetic fields. Binary data can be written into a data register disposed in proximity with the marker register under the influence of the marker domain. A given data bit is written into the data register at some location therein determined by the position occupied by the marker domain along the marker register. The data bit thus written into the data register depends upon the presence or absence of a domain-controlling current which determines whether or not the marker domain is transferred by magnetic domain growth into the data register.

The device of the invention is much less complicated and expensive than the modified random access memories of the prior art.

SUMMARY OF THE INVENTION

The first-in, first-out storage device of the invention consists of a marker register and a data register. Each register includes a thin multisegment, zig-zag strip or channel of magnetic material disposed on a background material such as tape, which either is non-magnetic or higher coercive force than the channel. The two strips or channels are contiguous and are disposed so that regions of intersection of adjoining segments of a given channel are in close proximity with corresponding regions of intersection of adjoining segments of the other channel. Since the magnetic thin film within the channel is of low coercive force, for the magnitude of fields applied during operation of the shift register, only that portion of the film within the channel is capable of being switched.

These fields are of such magnitude as to cause the growth of existing domains without creating new ones.

Each of the channels is traversed by a pair of domain-controlling electrical conductors, one passing over the uppermost regions of intersection of adjacent segments and the other passing over the lower regions of intersection of adjoining segments. In one embodiment of the invention, a fifth control conductor is added and is disposed between the two registers. A pair of mutually perpendicular magnetic biasing field producing means also is disposed adjacent the two channels.

A marker bit of information is represented by a small magnetic domain the direction of magnetization of which is opposite that of the channel; this marker initially is located at one of the regions of intersection of adjoining segments of the low coercive force channel of the marker register. Depending upon the direction of the magnetic biasing field along the easy axis of magnetization of the domain, the marker domain can be grown or shrunk.

Owing to the proximity of the two channels, if the marker domain is grown in the direction of the second (data) channel, the marker domain can be transferred into the data register, provided, of course, that a biasing magnetic field of the proper direction to achieve domain growth is supplied to the two registers. In this manner, a ONE can be written into the data register at a location determined by the position of the marker in the marker register. By applying a current to an appropriate domain controlling conductor of the data register which provides a magnetic field bucking the magnetic field of the marker domain, the aforesaid inter-register domain transfer can be inhibited and a ZERO written into the data register at a position dependent upon the position of the marker domain.

By applying currents to the wires of the two registers in proper sequence, the data written into the data register in the form of mangnetic information can be shifted past an output coil or other sensing means in the order in which the data was written therein. Furthermore, the marker domain in the marker register is shifted along with the data so that the position of the marker domain will correspond to the first empty data position (the position nearest the output) in the data register.

DESCRIPTION OF THE PREFERRED EMBODIMENT

Figures 1, 3A, 3B, 3C, 3D, 3E, 4A, 4B, 4C, 4D, 4E:
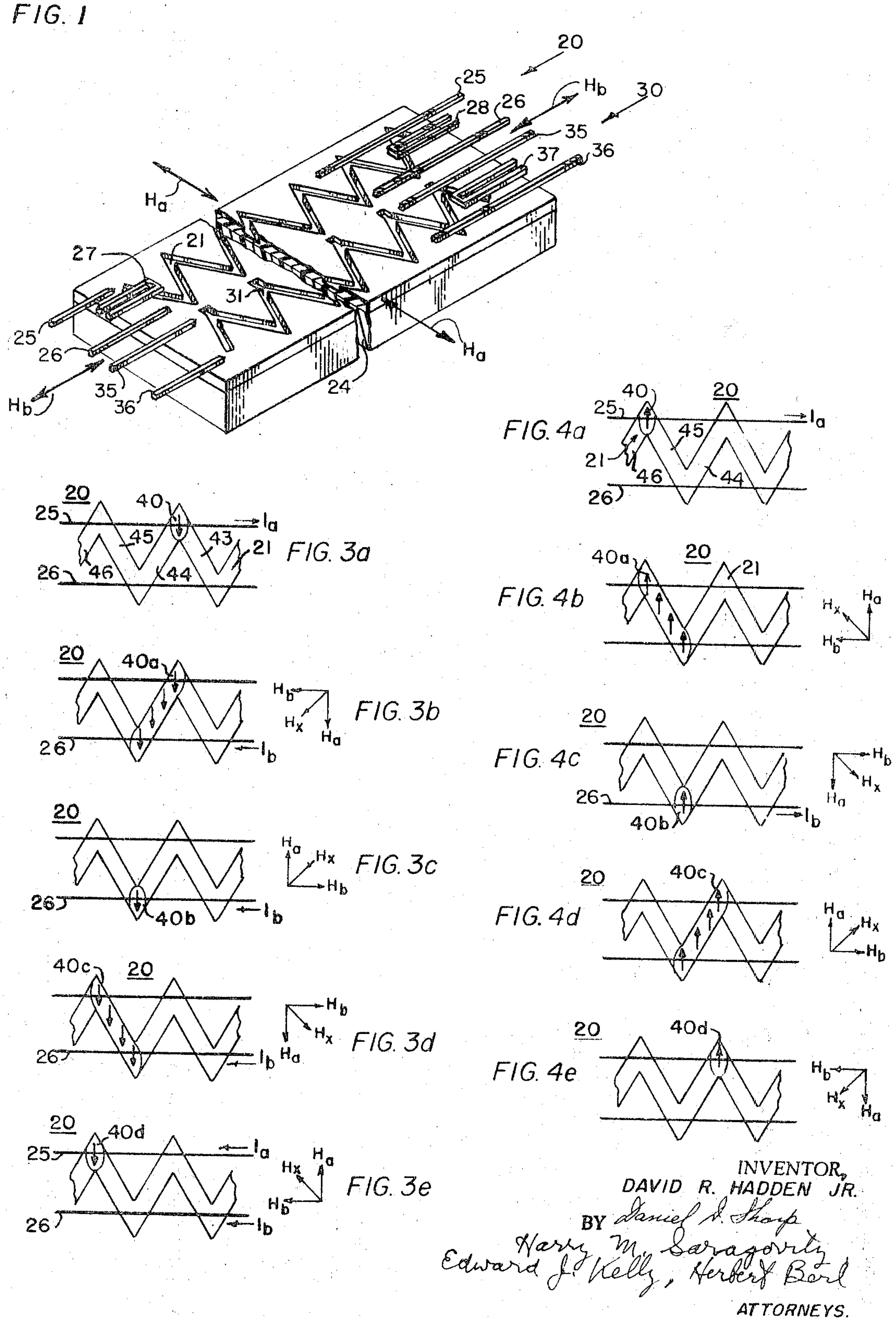
FIG. 1 is a pictorial view showing an embodiment of the invention.
FIGS. 3*a*–3*e* are diagrams showing the basic shift operation for a magnetic domain of opposite direction to that shown in FIG. 2.
FIGS. 4*a*–4*e* are diagrams showing the basic shift operation where the domain is shifted to the right, rather than to the left, as in the case of FIG. 2.

Referring to FIG. 1 of the drawing, a first-in, first-out storage device is shown which consists of two separate registers 20 and 30, referred to hereinafter as a marker register and a data register, respectively. Each register includes a thin multi-segment, zig-zag strip or channel 21 and 31 of magnetic material disposed on a background material 24 such as tape, which either is non-magnetic or of higher coercive force than the channel. The channels 21 and 31 of the respective registers 20 and 30 are contiguous and are disposed so that alternate regions of intersection of adjoining segments of a given channel are in close proximity with corresponding regions of intersection of adjoining segments of the other channel.

In the embodiment of the invention shown in FIGS. 1, 2 and 6, each of the channels is traversed by a pair of domain-controlling electrical conductors, one passing over the upper regions of intersection of adjacent segments and the other passing over the lower regions of intersection of adjoining segments. For example, in the device shown in FIGS. 1 and 2, in which the two channels are saw-tooth-shaped and disposed back-to-back, the domain-controlling wire 25 passes over the upper apices of marker channel 21 and the other control wire 26 passes over the lower apices of this channel. Similarly, control wire 35 passes over the upper apices of data channel 31 and control wire 36 passes over the lower apices of data channel 31.

A pair of mutually perpendicular magnetic fields can be selectively produced in the vicinity of the channels by means of appropriate coils, not shown, arranged to produce mutually perpendicular magnetic fields $H_a$ and $H_b$. The means for producing magnetic fields $H_a$ and $H_b$ may, for example, comprise a first set of Helmholtz coils connected to a first driver current source to provide a first uniform magnetic field $H_a$ along the axis of the coils which coincides with the easy axis of magnetization of the magnetic material in the channels 21 and 31 and a second set of Helmholtz coils connected to a second driver current source to provide a second uniform magnetic field $H_b$ along the axis of these coils of the second set which coincides with the hard axis of magnetization of the magnetic material in channels 21 and 31. The coils are arranged to produce a substantially uniform magnetic field in the region occupied by the registers 20 and 30. The direction of each of the magnetic fields $H_a$ and $H_b$ can be reversed simply by reversing the direction of current supplied to the coils from the corresponding driver current sources. For the magnitude of magnetic fields applied during operation of the storage device, only the portion of the film within the relatively low coercive force channel is capable of being switched. An output sensing coil 37 positioned adjacent the end of data channel 31, while marker sensors 27 and 28 coupled to the marker channel 21 at opposite ends thereof assist in determining that the data register 30 is full or empty, respectively. In order to permit undesirable transfer or coupling of magnetic domains from the data channel 31 of data register 30 to the marker channel 21 of marker register 20, two techniques are shown and described. One such technique involves flattening the upper apices of the data channel 31, as shown in FIGS. 1, 2, 6, 8 and 10; with this configuration, one effectively obtains a magnetic diode which permits domain transfer only along the direction from the marker channel segments with pointed apices to the data channel segments with blunted apices. Another technique for providing "one-way" domain growth is illustrated in FIGS. 12 and 13 and involves the use of an additional control wire 90 traversing the data channel 31 about midway between the upper and lower apices thereof. When this latter technique is employed and the current is supplied to the additional control wire 90, the need for blunted apices in the data channel 31 is obviated.

Figures 2A, 2B, 2C, 2D, 2E:
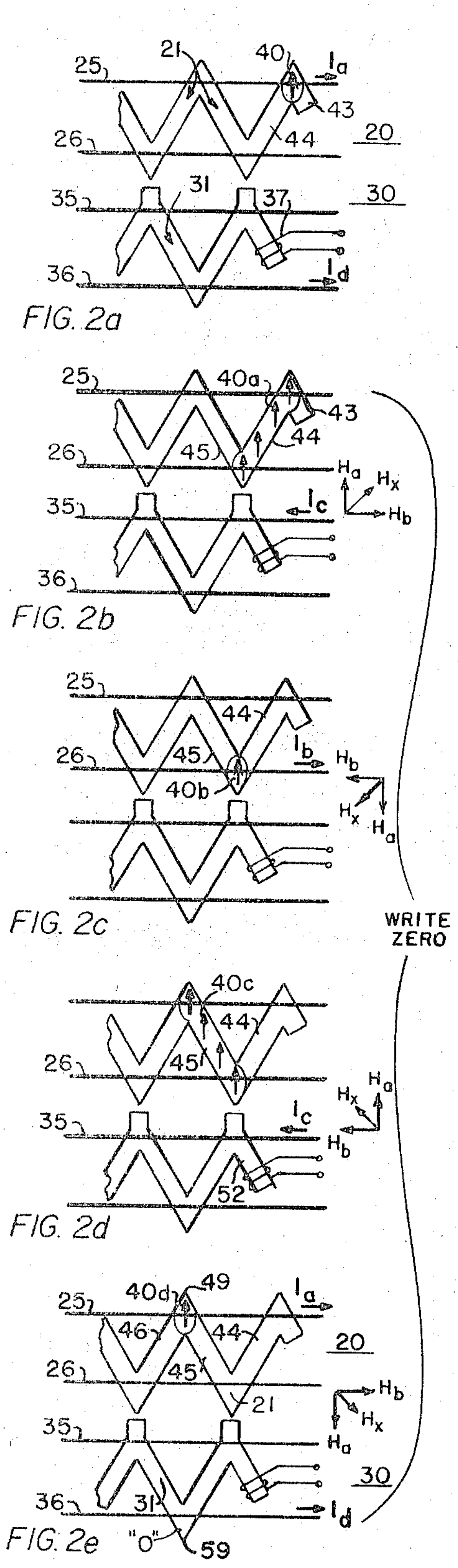
FIGS. 2*a*–2*i* are diagrams illustrating the basic shift operation and the basic write operation for the device shown in FIG 1.

In order to understand better the operation of the shift register according to the invention, a brief description of the basic shift operation cycle will be described with reference to FIGS. 2 to 4. In describing the basic shift cycle, only the upper (marker) register 20 of FIG. 2 will be mentioned. The remainder of the shift register in FIG. 2 will be referred to later during discussion of the write operation. The basic shift cycle consists of two sets of growing and shrinking steps. In FIG. 2*a*, a magnetic domain 40 is disposed at the apex or region of intersection of adjoining segments 43 and 44 of marker channel 21. The direction of magnetization of this domain 40 is illustrated as upward; the background magnetization will be in the opposite direction, or downward. A current $I_a$ flowing in control wire 25 in the direction indicated will produce a magnetic field wherein lines of force between the wire 25 and the channel 21 are in the same direction as lines of force of the domain 40. In FIG. 2, as in all subsequent figures, the wires will be assumed to be over the channels. The magnetic field produced by the current $I_a$ is such as to enhance the magnetization of the magnetic domain and tends to maintain the domain in the vicinity of control wire 25, thereby preventing total disappearance of said domain during the previous shrinking operation.

In FIG. 2*b*, the registers 20 and 30 are subjected to two perpendicular magnetic fields $H_a$ and $H_b$, the first being directed either up or down (the easy axis magnetization of the channel material) and the second being directed either to the left or right (the hard axis of magnetization). The means for producing such fields are well known in the art and, in lieu of the Helmholtz coils, already mentioned, the field producing means can comprise two flat spiral coils positioned adjacent the two registers and in a plane parallel to said registers, with the turns of said coils being oriented such that the fields produced by the two coils are mutually perpendicular.

If one desires to grow the domain of FIG. 2*a*, the easy axis of magnetization is such as to enhance the original magnetization of the domain. In other words, the easy axis magnetic field $H_a$ in FIG. 2*b* produced by current in the Helmholtz coils is directed upwardly. The hard axis magnetization produced by current in such coils will determine the direction of growth of the magnetic domain. In FIG. 2*b*, where the magnetic domain is to be grown along the segment 44 (that is, to the left), the hard axis field $H_b$ will be directed to the right, so that the resultant magnetic field $H_x$ formed by the two component fields $H_a$ and $H_b$ is substantially in the same direction as the segment 44 of the channel 21 along which magnetic domain growth is desired. The domain 40*a* shown in FIG. 2*b* has grown to occupy substantially the entire area of segment 44.

In FIG. 2*c*, the magnetic domain 40*a* of FIG. 2*b* is shrunk to 40*b* by reversing the direction of the easy axis field so that now the easy axis field $H_a$ opposes the magnetization of the domain. During the shrinking step, the hard axis of $H_b$ may be removed; if a hard axis field is used, however, the direction of the hard axis field will be a factor in determining the path of shrinking. In FIG. 2*c*, the hard axis field $H_b$ is directed to the left so that the combined magnetic field $H_x$ is in the direction of segment 44. The direction of shrinking along the path of segment 44 is dependent upon the control currents applied to the control wire 26. For example, when holding current $I_b$ in control wire 26 flows in the direction shown in FIG. 2*c*, a magnetic field is created which aids that of the domain to be shrunk in the vicinity of the region of intersection of segments 44 and 45 and the domain 40*b* has shrunk to the region of intersection of the segments 44 and 45 adjacent control wire 26. The magnetic field produced by applying current $I_b$ on control wire 26 either before or during the shrinking period also prevents the domain from shrinking entirely.

In FIG. 2*d*, the magnetic domain is grown to the left along segment 45 of the channel 21, as indicated at 40*c*. The easy axis field $H_a$ must be directed so as to enhance the magnetization of the domain to cause this growth; furthermore, the hard axis field $H_b$ is directed to the left so that the resultant magnetic field $H_x$ is along the direction of segment 45. The current $I_b$ in wire 26 either can be left on or removed during growth of the magnetic domain 40*c* along segment 45 in FIG. 2*d*.

Finally, (see FIG. 2*e*) the magnetic domain is shrunk, as shown by reference numeral 40*d*, to the region of intersection of segments 45 and 46 by application of a shrinking magnetic field $H_a$, and by a hard axis field $H_b$, if used, so oriented that the resultant magnetic field vector $H_x$ is along the path of shrinkage, that is, along the segment 45. A holding field is applied by means of the current $I_a$ to control wire 25 to prevent total shrinkage of the magnetic domain 40*d*. During one shifting cycle shown in FIGS. 2*a* to 2*e*, therefore, the magnetic domain 40 has been shifted from one of the upper regions of intersection of channel segments to the upper region of intersection of channel segments immediately to the left.

The basic shift cycle for shifting to the left, in cases in which the magnetic vector of the magnetic domain is directed downwardly, is shown in FIGS. 3*a* to 3*e* and need not be described in detail. Since the basic shift cycle can be explained without reference to the data register, only the marker register 20 is shown in FIGS. 3 and 4. The two magnetic biasing fields $H_a$ and $H_b$ in FIGS. 3*b* to 3*e* are oppositely directed from those shown in FIGS. 2*b* and 2*c*, respectively. Likewise, the holding currents $I_a$ and $I_b$ in FIG. 3 are in opposite directions from those of FIG. 2 since the magnetic field produced thereby should aid the downwardly directed field within the magnetic domain during the growth steps.

It is possible to shift the magnetic domain to the right, rather than to the left, by reversing the hard axis magnetization during the growing and shrinking steps. Such operation is shown in FIGS. 4*a* to 4*c*. In the operation in FIG. 4, the magnetic domain is assumed to be magnetized with the vector directed upwardly, as in the case of FIG. 4. Again, it should be noted that a reversal of direction of magnetization of the magnetic domain must be accompanied by a reversal in the direction of the applied biasing magnetic field.

Returnng now to FIG. 2, an explanation of the process of writing a data bit into the data register 30 will be described. In FIG. 2*a*, a marker domain 40 is disposed at the apex formed by the intersection of segments 43 and 44 of the marker register. Holding currents $I_a$ and $I_d$ remain flowing through control wires 25 and 26 of respective marker and data registers 20 and 30 from some previous operating cycle. These currents $I_a$ and $I_d$ are used during shrinking of the magnetic domain to prevent total shrinkage. The first step in the write operation is to grow the magnetic marker domain 40 of FIG. 2*a* to a position 40*a* as shown in FIG. 2*b*. The holding current $I_a$ is removed from control wire 25. As already described in connection with the basic shift operation, a pair of perpendicular magnetic fields $H_a$ and $H_b$ are presented to the shift registers, as shown in FIG. 2*b*. Owing to the proximity of the lower apices of register 20 and the upper apices of register 30, there is a tendency for the magnetic domain to transfer across the gap between registers 20 and 30 during this growing step. In order to prevent this transfer or coupling between registers 20 and 30, an inhibiting current $I_c$ is supplied to control wire 35 of data register 30 in the direction indicated in FIG. 2*b*. The field lines produced by this current $I_c$ are such that the magnetic field produced by this inhibiting current opposes the magnetization of the magnetic marker domain 40*a*. At the conclusion of the growing step, the entire region of segment 44 of marker register 20 is occupied by the grown magnetic domain 40*a*. The next step in writing information into the data register is to shrink the marker domain along segment 44 to 40*b*, as shown in FIG. 2*c*. In order to favor shrinkage in a downward direction to a lower apex of marker register 20, as shown in FIG. 2*c*, a holding current $I_b$ is passed through control wire 26 of the marker register 20 in the direction shown in FIG. 2*c* so that the lines of force set up by this current enhance the magnetization of the magnetic domain in the region of intersection of segments 44 and 45. This holding current thus favors shrinkage in the downward direction and precludes the possibility of the magnetic domain shrinking toward the upper apex of segment 44. It should be noted that the path of shrinkage of the magnetic domain is substantially along the direction of the resultant vector shown in FIG. 2*c* and could be either up or down along the path. During the next writing step shown in FIG. 2*d*, the domain 40*b* in FIG. 2*c* is grown to 40*c* which occupies substantially the entire area of segment 45 of marker register 20. This is accomplished by means of the magnetic fields $H_a$ and $H_b$ in FIG. 2*d*, together with the inhibiting current $I_c$ flowing in control wire 35 of data register 30. This inhibiting current prevents the tendency of the magnetic domain to grow into segment 52 of data register 30. The control current $I_b$ can be removed from control wire 26 during the growing step of FIG. 2*d*, since it is not needed; this current does no harm, however, if left in wire 26. The final step in writing involves shrinking the domain shown in FIG. 2*e* to the upper apex at the intersection of segments 45 and 46 of marker register 20 (see domain 40*d*) by applying the two magnetic biasing fields $H_a$ and $H_b$ shown in FIG. 2*e* and by passing a holding current $I_a$ in control wire 25 of marker register 20. This holding current $I_a$ tends to favor shrinkage in the direction of the upper apex 49 underlying the wire through which the holding current passes. Although not necessary in writing a ZERO into data register 30, a holding current $I_d$ is pased through control wire 36 of data register 30 during the final writing step shown in FIG. 2*e*, since there may be ONE's in the data register which must be kept from shrinking entirely off the data register during the final shrink step. At the conclusion of the writing operation, the marker domain 40 appears at upper apex 49 of marker channel 21. In other words, marker domain 40 has been shifted one position to the left while a ZERO, that is, the absence of a magnetic domain in data register 30, appears at the lower apex 59 of channel 31 of data register 30. This ZERO data bit occupies a position along the data register 30 corresponding to the position along the marker register 20 occupied by the marker bit 40*d*.

Figures 2F, 2G, 2H, 2I:
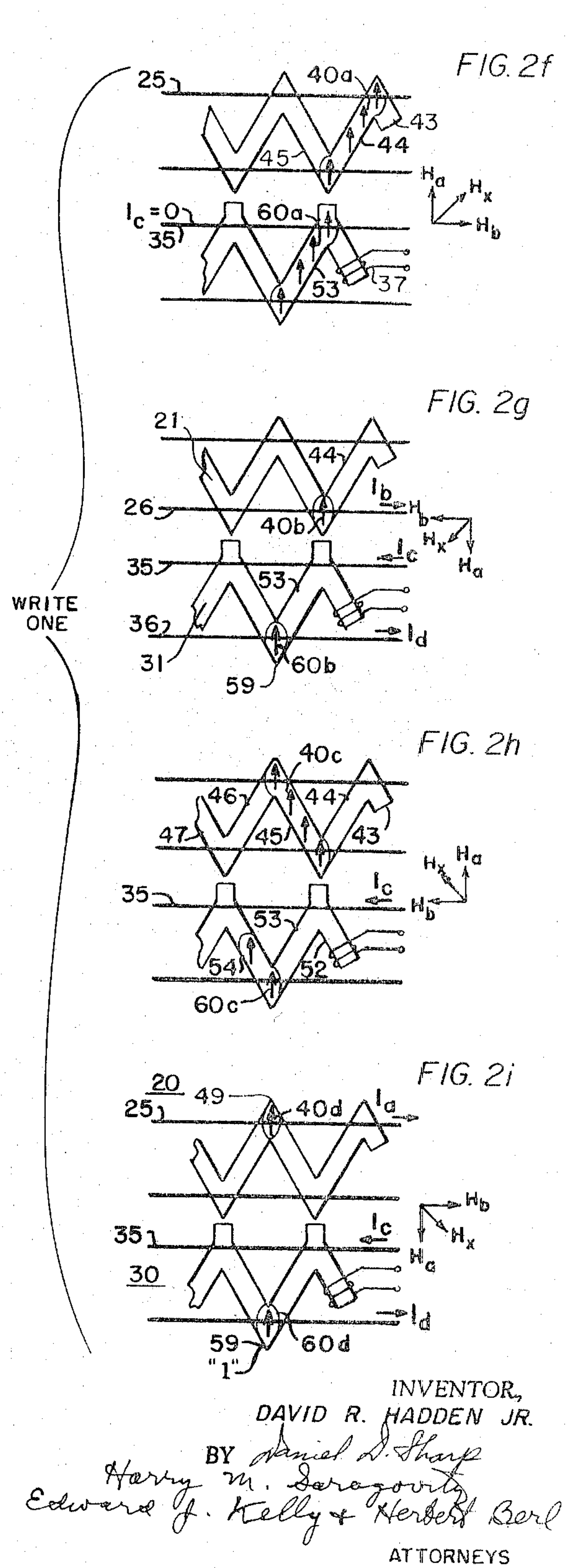

The manner in which a ONE is written into the data register will now be described with reference to FIGS. 2*a*, and 2*f* to 2*h*, inclusive. Prior to beginning of the operating cycle for writing a ONE into the data register 30, the marker domain 40 is shown in FIG. 2*a* as occupying a region formed by the intersection of segments 43 and 44 of marker register 20. As previously explained, prior holding currents $I_a$ and $I_d$ pass through control wires 25 and 36, respectively. The first step in the operating cycle involves growing the marker domain along segment 44 or marker channel 21, as shown in FIG. 2*f*. This is accomplished by application of two mutually perpendicular magnetic biasing fields $H_a$ and $H_b$ shown in FIG. 2*f* to the two registers. The holding currents $I_a$ and $I_b$ are removed, if they have not already been removed. As was noted previously, there is a normal tendency, owing to the proximity of the adjacent apices of the two registers, for the magnetic domain in the marker register to transfer or couple across into the segment 53 of the data register during the growing period. It will be recalled that, in the case of a ZERO to be written into the data register, this tendency was inhibited by means of an inhibiting current $I_c$ passed through the control wire 35 of data register 30. When a ONE is to be written into the data register, however, this inhibiting current $I_c$ in control wire 35 is removed; in this manner, the normal tendency of the magnetic domain 40*a* to grow across into the segment 53 of the data register 30 is encouraged and a magnetic domain 60*a* occupies substantially the entire area of the segment 53 of data register 30. It is during the first growing step, shown in FIGS. 2*b* and 2*f*, that the writing for a ZERO and a ONE basically differ. During the shrinking step shown in FIG. 2*g*, the direction of the easy axis magnetization $H_a$ is reversed and holding currents $I_b$ and $I_d$ are passed through the wires 26 and 36 of respective registers 20 and 30, thereby favoring shrinkage of the domains previously in FIG. 2*g* to the lower apices. As a result of the shrinking operation, domain 40*b* appears at the lower apex of marker channel 21 shown in FIG. 2*g* and now a shrunken domain 60*b* appears at the lower apex 59 of data channel 31. During the shrink interval of FIG. 2*g*, the inhibiting current $I_c$ can be supplied to control wire 35, although its absence during this step is not critical. Next follows a second growing step wherein magnetic fields $H_a$ and $H_b$ are applied as shown in FIG. 2*h* to establish a tendency for growth of the marker and data domains along respective segments 45 and 54 of the two registers. The inhibiting current $I_c$ passed through wire 35 of data register 30 during this time accomplishes two purposes. First, it prevents transfer of domain 40*c* along the resultant magnetic vector of the two biasing fields into the segment 52 of data register 30. Second, this current inhibits full growth of the domain 60*c* along segment 54 of data register 30 and up into the segment 47 of marker register 20. Finally, as shown in FIG. 2*i*, a shrinking field is applied to the two registers. The path along which shrinkage will be accomplished is indicated approximately by the direction of the resultant vector $H_x$ of the two magnetic fields. Holding currents $I_a$ and $I_d$ are applied to control wires 25 and 35 of marker register 20 and data register 30, respectively. These holding currents favor shrinkage to the upper apex 49 of the marker channel 21 and to the lower apex 59 of the data channel 31. At the conclusion of the writing cycle shown in FIGS. 2*f* to 2*i*, a ONE (data domain 60*d*) is written into the lower apex 59 at a position along the data channel 31 corresponding to the position of the marker bit (magnetic domain 40*d*) in the marker register 20. In normal operation, the inhibiting current $I_c$ in wire 35 of the data register 30 will be left on at all times during the writing operation except during the one step shown in FIG. 2*f* in which transfer of the magnetic domain during growth from the marker register to the data register is to be accomplished. In some instances, as for example, in the steps shown in FIGS. 2*g* and 2*i*, this inhibiting current need not be applied. However, for drive circuit simplicity, this current usually is maintained in control wire 35 of data register 30 except in the instance above cited when a ONE is to be written into the data register.

Figure 5:
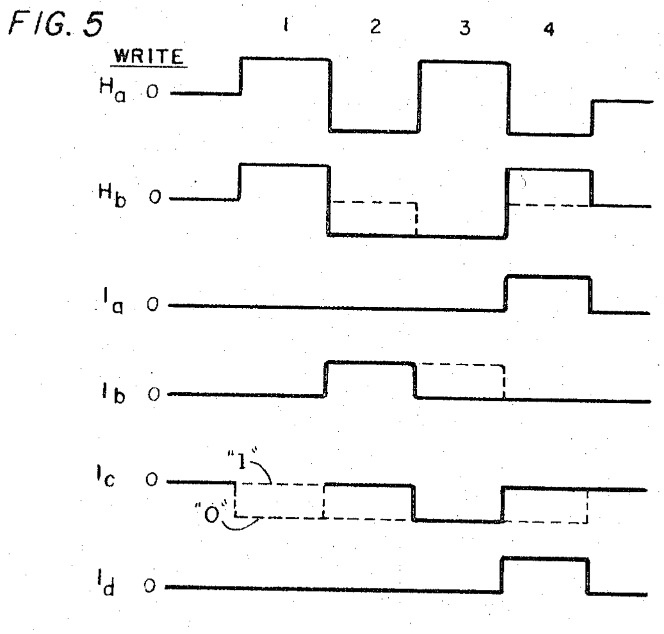
FIG. 5 are waveforms of the currents used in driving the magnetic coils and the various control wires during the write operation shown in FIG. 2.

In order to facilitate understanding of the writing operation, waveforms are shown in FIG. 5 indicating the currents supplied to the two magnetic field biasing producing means and the four domain controlling wires of the two shift registers. The time intervals indicated in FIG. 4 as 1, 2, 3 and 4 correspond, respectively, to the intervals illustrated in FIGS. 1*b*, 1*c*, 1*d*, and 1*e*, respectively, or FIGS. 1*f*, 1*g*, 1*h*, and 1*i*, respectively. In those portions of the operating cycle in which the currents are optional, this choice is indicated by dotted lines. In FIG. 5*e*, the waveforms during interval 1 differ for a ONE and a ZERO. This difference is indicated by the reference numerals 1 and 0.

The manner in which information is read out of the data register is shown in FIG. 6. In FIG. 6*a* the marker bit 40 is shown at an upper apex 49 of the marker channel 21 and the data bit 60 in this case a ONE, is shown at a lower apex 59 of data channel 31. Holding currents $I_a$ and $I_d$ are supplied to the domain-controlling wires 25 and 36 of the two registers from a previous cycle. In FIG. 6*b*, the growth of the two domains is illustrated. A pair of mutually perpendicular magnetic fields are produced, as shown in FIG. 6*b*, so that the resultant magnetic vector $H_x$ is approximately in the direction of the segments 45 and 54 of the two registers along which the magnetic domain growth is to be accomplished. An inhibiting current $I_c$ is applied to control wire 35 of data register 30 to prevent growth of the domain 40*a* into the segment 52 of data channel 31. This inhibiting current $I_c$ further prevents total growth of the magnetic domain 60*a* in the segment 54 of the data channel 31 up to the apex 58 and into segment 47 of marker register 20. In FIG. 6*c*, a shrinkage operation is shown wherein the magnetic fields are reversed from those shown in FIG. 6*b* and the holding currents $I_b$ and $I_d$ are passed through the respective domain controlling wires 26 and 36 of the registers 20 and 30. At the conclusion of this shrinking cycle, the shrunken domains 40*b* and 60*b* exist at lower apices of the two registers shown in FIG. 6*c*. In the next step, illustrated in FIG. 6*d*, the domains 40*b* and 60*b* of FIG. 6*c* are grown to the right by applying the magnetic fields shown in FIG. 6*d*, and by permitting an inhibiting current $I_c$ to flow in the domain controlling wire 35 of the data register 30. With the currents and fields shown in FIG. 6*d*, the domain 40*c* in segment 44 of the marker register occupies substantially the entire area thereof and the domain 60*c* in segment 53 of the data register is grown partially along the segment 53. Next, as shown in FIG. 6*e*, the domains are shrunk by application of a shrinking fields and by the application of holding currents $I_a$ and $I_d$. At the conclusion of this shrinking period, shown in FIG. 6*e*, the marker bit 40*d* now resides at the upper apex 63 forming the intersection of segments 43 and 44 of marker channel 21 and the data bit 60*d* is located at the lower apex 59 formed by the intersection of segments 53 and 54 of the data channel 31.

Figure 6A:
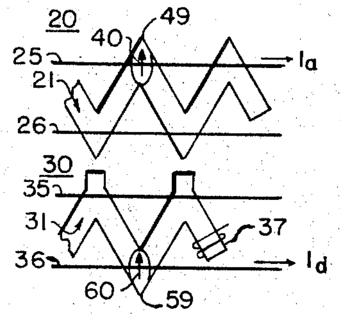
FIGS. 6*a*–6*i* are diagrams showing the basic read operation of the device shown in FIG. 1.
Figure 6B:
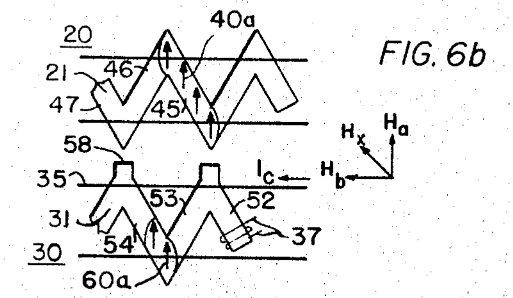
Figure 6C:
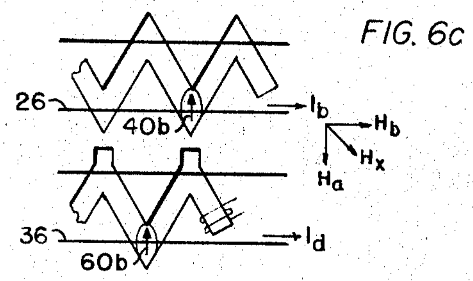
Figure 6D:
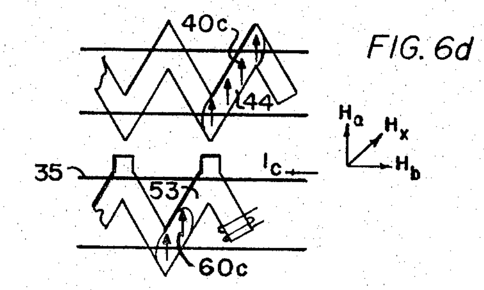
Figure 6E:
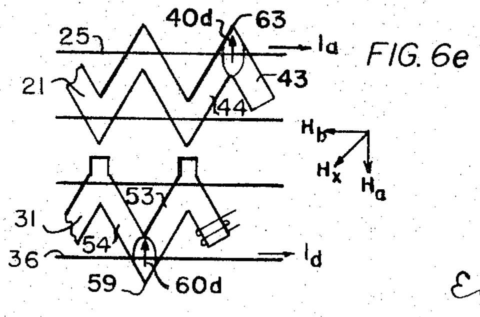
Figure 6F:
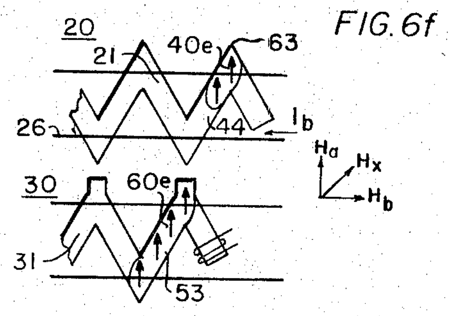
Figure 6G:
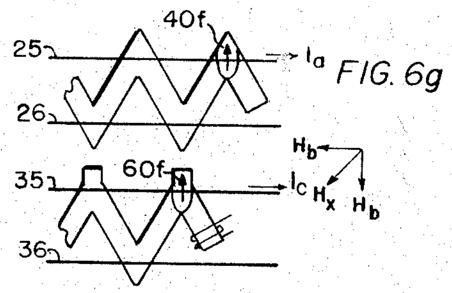
Figure 6H:
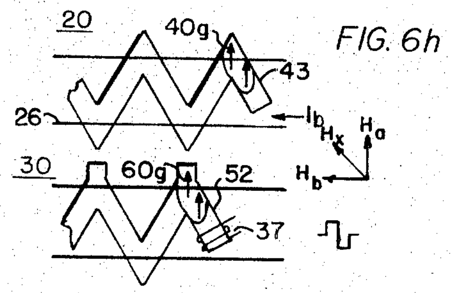
Figure 6I:
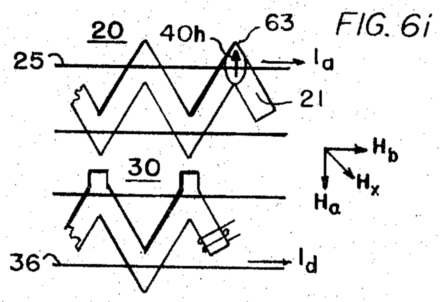

It will be noted that in the operating steps shown in FIGS. 6*a* to 6*e*, the data has remained centered about the apex 59 of the data channel 31 whereas the marker bit 40 has been moved to a position one upper apex to the right of that in which it formerly existed. In the remaining steps of this read cycle, illustrated in FIGS. 6*f* to 6*i*, the marker will be held centered about the upper apex 63 of marker register 20 while the data is moved to the right. With the magnetic biasing fields as shown in FIG. 6*f* and with the current $I_b$ in wire 26 of marker register 20 in the direction shown in FIG. 6*f*, the domains of FIG. 6*e* are grown as indicated in FIG. 6*f* along segments 44 and 53 of the respective channels 21 and 31. Because of the inhibiting effect of the current $I_b$, the domain 60*e* growing in segment 53 of data channel 31 will not be transferred into the segment 44 of the marker channel and the domain 40*e* growing along segment 44 of marker channel 21 will remain within the confines of segment 44 of the marker register, rather than being transferred across to the segment 53 of data channel 31. In FIG. 6*g*, the magnetic fields have been reversed and holding currents $I_a$ and $I_c$ supplied to wires 25 and 35 of the two registers 20 and 30, respectively. The inhibiting current $I_b$ in wire 26 can now be removed. The two domains shrink to upper apices of the respective registers as shown at 40*f* and 60*f*. In FIG. 6*h* a growing field is supplied to the registers, and inhibiting current $I_b$ again supplied to the control wire 26 of marker register 20. The holding currents $I_a$ and $I_c$ can now be removed. The current $I_b$ in control wire 26 prevents the marker domain 40*f* from growing to the lower apex of the marker channel 21. During the operating step shown in FIG. 6*h*, the data bit or data magnetic domain 60*g* will grow along the final segment 52 of the data register 30 and will pass the sensing coil 37 surrounding this final segment. As this magnetic domain grows past the sensing coil 37, an output voltage will be induced in the sensing coil; in other words, a ONE output will be derived. In the final step of the read cycle, shown in FIG. 6*i*, holding currents $I_a$ and $I_d$ are supplied to wires 25 and 36 of the respective marker and data registers 20 and 30. During this final step (FIG. 6*i*), the shrinking field is applied to the registers such that the marker domain 40*h* is shrunk to the upper apex 63 of the marker channel 21 in the vicinity of the wire 25 through which the holding current $I_a$ is flowing. The holding current $I_d$ is needed to facilitate shrinkage of data domains in the data register toward the lower apices of the data register and to maintain the data magnetic domains at these lower apices pending the start of another read cycle. It will be evident that during the portion of the read cycle shown in FIGS. 6*f* to 6*i*, the marker bit 40 has been substantially fixed in position, while the data domain 60 has been moved one position to the right. When the marker has reached the extreme point along the register, external means, not forming a portion of this invention, indicates this attainment of the extreme position and no further reading will be achieved until such time as the marker has been appropriately moved to another position along the marker register.

Figure 7:
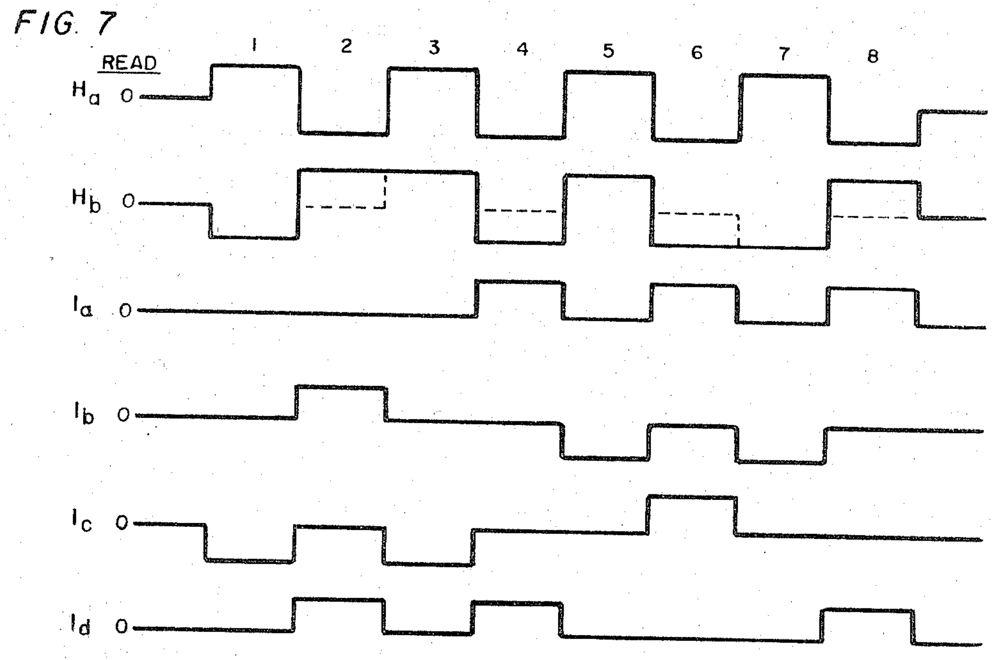
FIG. 7 are waveforms of the currents used in driving the magnetic coils and the various control wires during the read operation shown in FIG. 6.

Typical waveforms showing the currents applied to both the hard and easy axis magnetic field producing means and to the domain controlling wires of the two registers are shown in FIG. 7. As previously explained, one can dispense with hard axis field during the shrinking period; this is indicated in FIG. 7 by the dotted portion of the waveforms. The periods indicated in FIG. 7 as 1 to 8 inclusive correspond to the steps of the read cycle shown respectively in FIGS. 6*b* to 6*i*. As in the case of the waveforms shown in FIG. 5, the current supplied to the easy and hard axis field producing coils is bipolar. During the reading cycle, as shown in FIGS. 7*d* and 7*e*, the drives for the domain controlling wires 26 and 35 are also bipolar.

Figures 8A, 8B, 8C, 8D, 8E:
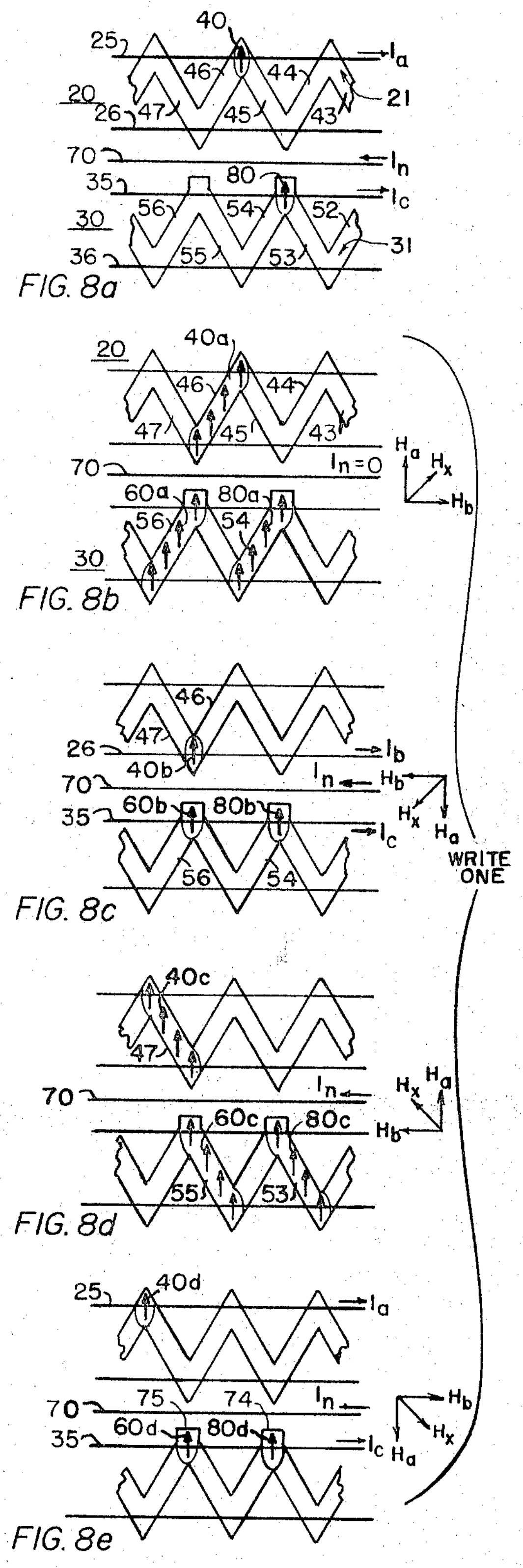
FIGS. 8*a*–8*i* are diagrams showing a typical write operation for a modification of the embodiment of the invention shown in FIG. 1.

A modification of the shift register of FIGS. 1, 2, 4 and 6 is shown in FIGS. 8 and 10. In the shift register shown in FIG. 8, a fifth domain controlling wire 70 is positioned between the two registers, in addition to the four domain controlling wires 25, 26, 35 and 36. When this fifth wire is used, one does not need to shift the marker and the data registers separately during the reading operation. The basic writing operation with this fifth wire system is shown in FIG. 8. With the fifth wire system, it will be noted that the data bits are stored in the upper portions of the data register, rather than at the lower portions thereof, as in the case of the previously designed shift register. In FIG. 8*a*, a ONE (data domain 80) has been stored at an upper apex formed by intersection of segments 53 and 54 of the data channel 21 and the marker domain 40 is positioned at an upper apex formed by the intersection of segments 45 and 46 of the marker channel 21.

Assume now that a ONE (data domain 80) already has been written into the data register 30. In FIG. 8*b*, the domains of FIG. 8*a* are grown, by means of a growing field indicated in FIG. 8*b*, along the direction of the resultant vector $H_x$ of the two magnetic fields applied to the registers. No current is passed through the fifth control wire 70 at this time; in other words, $I_n=0$. The marker domain 40 of FIG. 8*a* grows through the entire region of the segment 46 of the marker channel into a domain 40*a* and is transferred into the data register 30 to form data domain 60*a* which essentially fills the segment 56 of the data channel. At the same time, the data bit 80 already in the data register is grown along segment 54 of data register 30 to form data domain 80*a* as shown in FIG. 8*b*. In FIG. 8*c*, a shrinking step is shown and magnetic fields $H_a$ and $H_b$ are applied in the direction indicated. In addition, current $I_n$ passes through the control wire 70 and holding currents $I_b$ and $I_c$ are supplied to the control wires 26 and 35, respectively. The holding current $I_b$ prevents the domain 40*b* from shrinking upwardly along segment 46 and current $I_c$ prevents the domains 60*b* and 80*b* from shifting downwardly along respective segments 56 and 54 of the data register. The current $I_n$ in the control wire 70 inhibits transfer of the domains from one register to the other. In the step illustrated in FIG. 8*d*, a growing field is applied to the two registers and the holding currents $I_b$ and $I_c$ are removed. The control current in control wire 70 is still applied to this control wire to prevent growth from one register to the other. The domain 40*c* in the marker register (see FIG. 8*d*) grows along segment 47 thereof and the domains 60*c* and 80*c* in the data register 30 extend along the segments 53 and 55 to occupy substantially the entire area thereof. In FIG. 8*e*, the shrinking operation is shown wherein the domains are all shrunk to the upper apices indicated. The holding currents $I_a$ and $I_c$ again serve to facilitate shrinkage in the proper direction. At the conclusion of this shrinking operation shown in FIG. 8*e*, it will be noted that an additional ONE (data domain 60*d*) has been written into the data channel 31 at apex 75 just behind the ONE (domain 80*d*) previously written therein at apex 74.

Figures 8F, 8G, 8H, 8I:
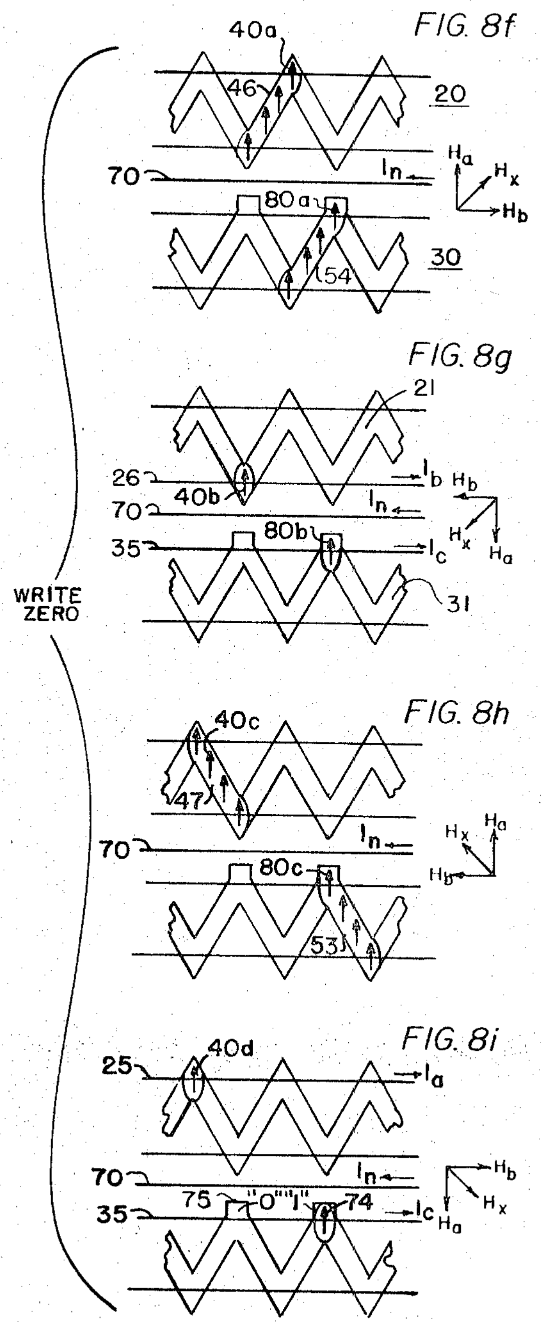

FIGS. 8*a* and 8*f* to 8*i* illustrate the manner in which a ZERO is writen into the data regster. The marker domain and the ONE bit originally are as shown in FIG. 8*a*. Durign the first step in the writing operation, as shown in FIG. 8*f*, the basic distinction between writing a ZERO and writing a ONE is shown. In writing a ONE, it will be remembered from FIG. 8*b* that the control current $I_n$ was reduced to ZERO during the growing cycle and the marker domain was allowed to transfer into the data register. In the case of a ZERO, however, as shown in FIG. 8*f*, the growth of a marker domain into the data register must be inhibited. This is done by means of the control current $I_n$ allowed to flow in control wire 70 during this period. With the application of the necessary growth fields, the domains of FIG. 8*a* are grown along the segments 46 and 54, as indicated in FIG. 8*f*. The resulting domains are indicated as 40*a* and 80*a*. In FIG. 8*g*, a shrinking step is shown with the magnetic fields being reversed from those shown in FIG. 8*f* and the holding currents $I_b$ and $I_c$ now flowing in the control wires 26 and 35 of the marker and data registers. The control current $I_n$ continues to flow in control wire 70. At the conclusion of the shrinking cycle shown in FIG. 8*g*, the marker domain 40*b* has shrunk to the lower apex of channel 21, and the ONE data bit already in data register 30 has shrunk as shown at 80*b* to the upper apex of channel 31. The next step is shown in FIG. 8*h* wherein a growing magnetic field is applied to the registers and the holding currents $I_b$ and $I_c$ can be removed from respective control wires 26 and 35. The marker domain grows along segment 47, as indicated at 40*c* and the ONE data bit grows along the segment 53, as indicated at 80*c*. Interregister transfer is inhibited by the control current $I_n$ in control wire 70. The final step in writing a ZERO into the data register is shown in FIG. 8*i* wherein a shrinking field is applied to the registers. The control current $I_n$ in control wire 70 is still flowing, as in the case of FIGS. 8*f* to 8*h*. The control current, in this case, assists in determining the direction of shrinkage of the domains along segments 47 and 53 and permits the domain 40*d* in segment 47 of FIG. 8*i* to shrink to the upper apex 66 of the marker channel 21 and permits the data domain 80*d* to shrink to the upper apex 74 shown in FIG. 8*i* of data channel 31. At the conclusion of the writing cycle, it will be noted that there is no magnetic domain at the apex 75 next to the data domain in apex 74. In other words, a ZERO has been written into the data register at the apex 75.

Figure 9:
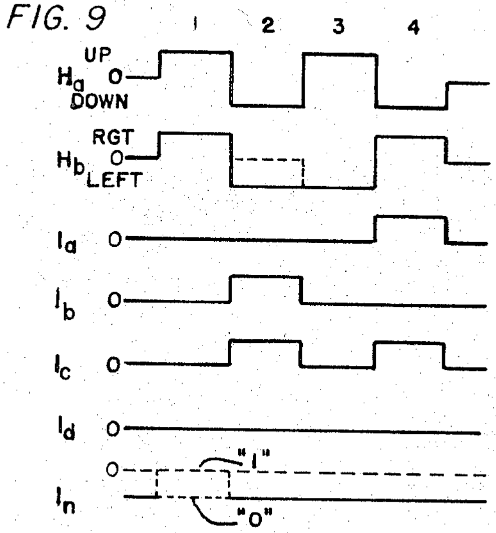
FIG. 9 are waveforms of the driver currents for the modified device of FIG. 8 during the write operation.
Figure 11:
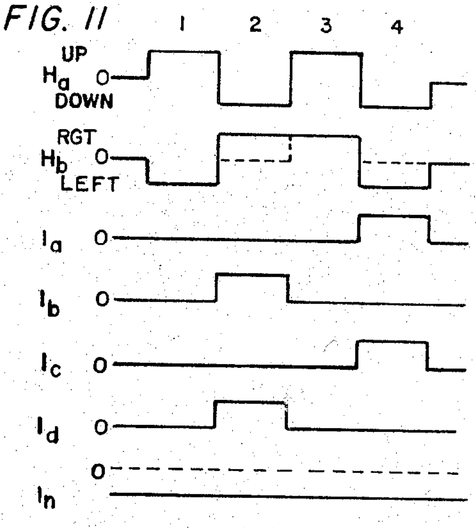
FIG. 11 are waveforms of the driver currents for the modified device of FIG. 10 during the read operation.

The waveforms of the currents supplied to the coils of the magnetic field producing means and to the various domain controlling wires is shown in FIG. 9. The intervals designated in FIG. 9 as 1, 2, 3 and 4 are the intervals shown, respectively in FIGS. 8*b*, 8*c* ,8*d* and 8*e* or in FIGS. 8*g*, 8*h*, 8*i* and 8*j*. The reading operation for this five-wire system is shown in FIG. 11.

Figure 10A:
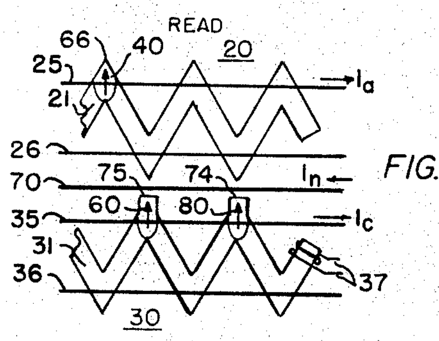
FIGS. 10*a*–10*e* are diagrams showing a read operation for the modified device shown in FIG. 8.
Figure 10D:
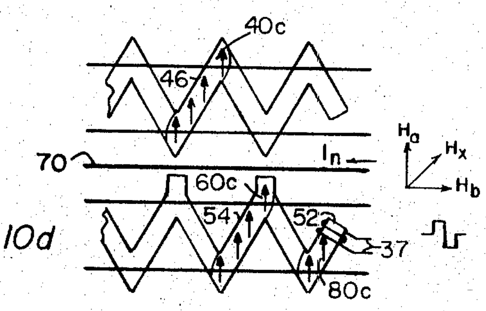
Figure 10B:
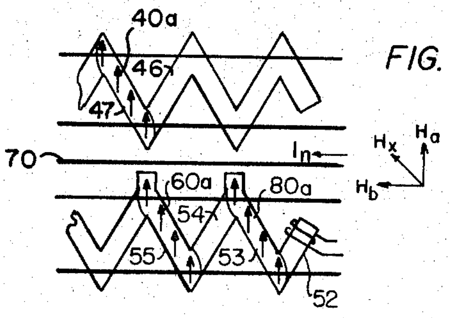
Figure 10E:
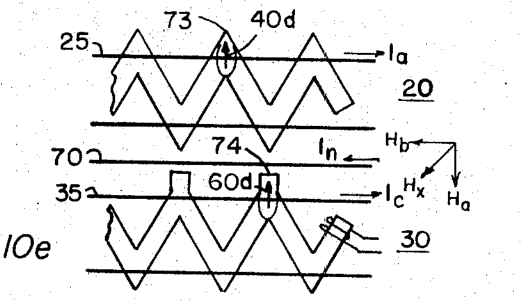
Figure 10C:
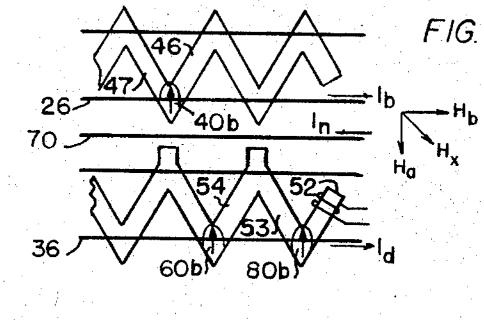

At the beginning of the read cycle, as shown in FIG. 10*a*, the domains are just as they were in FIG. 8*e*, that is, the marker bit 40 is at the upper apex 66 in marker register 20 and two successive ONE data bits 80 and 60 are located at adjoining upper apices 74 and 75 of the data register 30. Upon application of a growing field to the registers, as shown in FIG. 10*b*, and, with a control current $I_n$ applied to control wire 70, the marker domain **40*a* grows down along the segments 53 and 55 of the data channel 31. Interregister transfer of domains is prevented by the control current $I_n$ in line 70**. In FIG. 10*c*, a shrinking step is shown wherein the shrinking fields are applied to the two registers, together with the holding currents $I_b$ and $I_d$ on control wires 26 and 36, respectively. Although, in the shrinking step we do not need the control current $I_n$, it is normally left flowing at all times during the reading process. The marker domain **40*b* shrinks around the lower apex in the vicinity of the holding current $I_b$ in control wire 26 and the data domains 80*b* and 60*b* shrink down to the lower apices in the vicinity of the holding current $I_d$ in control wire 36**. The next step is shown in FIG. 10*d* wherein growing fields are applied to the registers and the holding fields can be removed from about wires 26 and 36. The control current $I_n$ in wire 70 prevents inter-register transfer of domains **80*c* and 60*c*. As the right-hand data domain 80*c* grows along segment 52 of the data register 30, it passes the sensing coil 37** and causes a voltage to be induced in said coil. In other words, a ONE is read out of the data register. Finally, as shown in FIG. 10*e*, a shrinking field is applied to the registers, together wth the holding currents $I_a$ and $I_c$ in control wires 25 and 35, respectively. The marker domain **40*d* then shrinks up to the upper apex 73 in the vicinity of the control wire 25 and the remaining data domain 60*d* shrinks up to the upper apex 74 adjacent the control wire 35. Again, the control current $I_n$ in control wire 70** is not necessary; however, it is easier to construct a control circuit, which, during the entire read cycle, has a constant output. This output is shown, incidentally, in FIG. 11*f*. FIG. 11 shows a waveform of the current supplied to the magnetic field producing means and to the various driver wires. It will be noted that, with the five-wire system, during the reading operation, all inputs to the driver wires are monopolar, in contrast with the waveforms in the reading operation of the four-wire system. For example, referring back to FIG. 7, it is noted that the driver currents $I_b$ and $I_c$ during the read operation for the four-wire system will require bipolar devices. No such devices would be required for driving currents with a five-wire system, however. Bipolar devices are more difficult to implement than monopolar devices and some of the drive circuits for the five-wire system thus are somewhat simplified.

In FIG. 12, a modification of the four-wire system of FIG. 2 is shown in which an additional control wire 90 is positioned substantially along the longitudinal axis of data register 30 to prevent bilateral transfer of magnetic domains between marker and data registers 20 and 30. This approach does away with the need for blunting the upper apices of data channel 31, described in FIGS. 1, 2, 6, 8 and 10.

With the modification shown in FIG. 12, the first growing period requires two separate steps with different control currents (see FIGS. 12*b* and 12*c*) as compared with the single-step growing operation shown in FIG. 2*f*. In FIG. 12*a*, it is assumed that initially a ONE data bit 80 already has been written into a lower apex of data register 30 shown in FIG. 12*a* and that the marker bit 40 is at a juxtaposed upper apex of marker register 20. The currents $I_a$, $I_c$ and $I_d$ are applied, just as in the device of FIG. 2*a*.

Figure 12A:
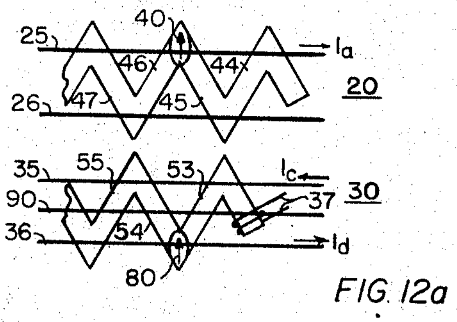
FIGS. 12*a*–12*f* are diagrams of a modified form of the device shown in FIG. 8 illustrating the write operation.
Figure 12B:
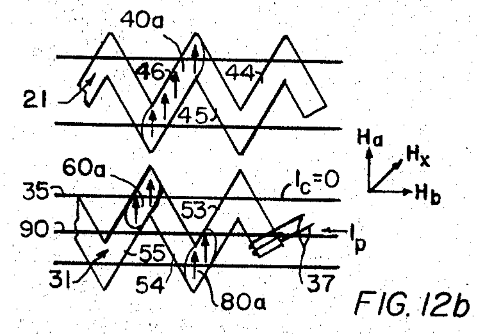
Figure 12C:
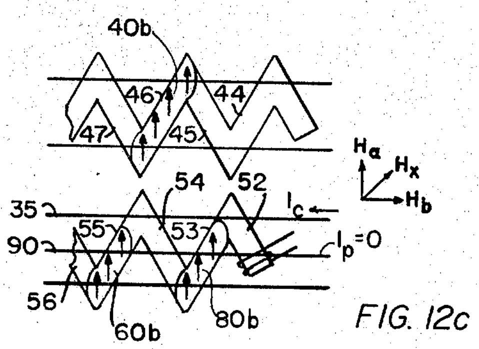
Figure 12D:
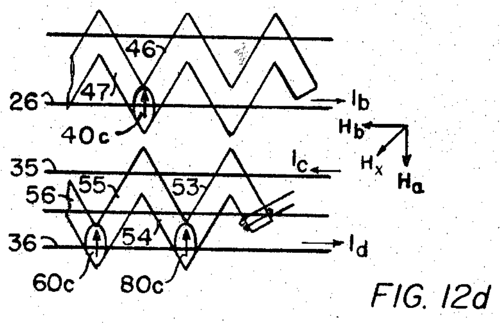
Figure 12E:
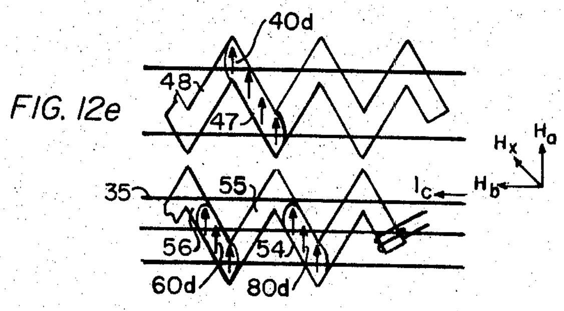
Figure 12F:
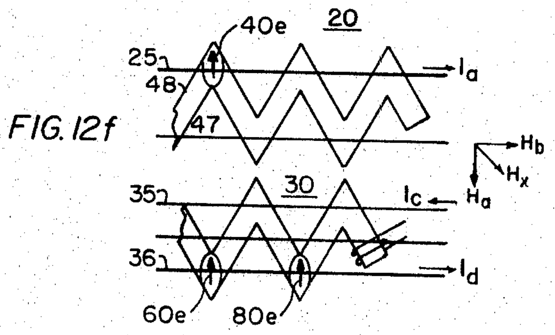

If a ONE is to be written into data register 30, growing magnetic fields $H_a$ and $H_b$ are applied, as indicated in FIG. 12*b*, and control current $I_c$ in control wire 35 is removed. In FIG. 12*b*, as contrasted with FIG. 2*f*, however, an added driver current $I_p$ is supplied to the device. The driver current $I_p$ is applied to the additional control wire 90 of the data register 30 in a direction such as to oppose growth of the magntic domain **60*a*, transferred from marker register 20, to the lower end of segment 55 of channel 31 and prevents growth of data domain 80*a* to the upper end of segment 53 of the data channel 31. In this manner, undesirable transfer of the data domain 80*a* from segment 53 of data channel 31 into segment 44 of marker channel 21** is precluded. During the second portion of the first growth operation shown in FIG. 12*c*, the control current $I_p$ in control wire 90 is removed and the control current $I_c$ is supplied to control wire 35. It should be noted that during the operation shown in FIG. 12*c*, the control current $I_c$ must be applied to control wire 35 at least slightly prior to removal of control current $I_p$ from control wire 90. This can be done by properly timing the generation of control pulses $I_c$ and $I_p$. The domains **40*b*, 60*b* and 80*b*** of FIG. 12*c* remain substantially as shown in FIG. 12*b*, except for slight extension of the data domains **60*b* and 80*b*; full growth of these data domains 60*b* and 80*b* is prevented owing to the presence of current $I_c$ in control wire 35. The marker domain 40*c* and data domains 60*c* and 80*c*** of FIG. 12*d* are shrunk by application of the magnetic shrinking fields and by application of holding current $I_b$ and $I_d$ to control wires 26 and 36, respectively. The control current $I_c$ remains flowing in control wire 35. The marker domain **40*d*** is grown, as shown in FIG. 12*e*, along segment 47 of marker channel 21 and the data domains **60*d* and 80*d* are grown along respective segments 56 and 54 of data register 30 by means of the growing magnetic fields. Full growth of the data domains 60*d* and 80*d* to the upper apices of respective segments 56 and 54 is prevented by the current $I_c$ in control wire 35**. Finally, as shown in FIG. 12*f*, the marker domain **40*e* is shrunk to the upper apex terminating segment 47 of the marker channel 21 and the data domains 60*e* and 80*e* are shrunk to adjoining apices of data channel 31. During this shrinking period the holding currents $I_a$ and $I_d$ are supplied to respective control wires 25 and 36, in addition to the control current $I_c$ in control wire 35. It should be noted that a ZERO could have been written into the data register 30 by applying a control current $I_c$ to control wire 35 of data register 30** in the operation shown in both FIGS. 12*b* and 12*c*. In other words, to write a ZERO into data register 30, a control current $I_c$ in FIG. 12*b* would be applied to control wire 35; furthermore, the current $I_p$ in control wire 90 in FIG. 12*b* would be optional. In the case of a ZERO, therefore, the two portions of the first growing operation shown in FIGS. 12*b* and 12*c* could be identical; it is only when a ONE is to be written into the data register that the two portions of the first growing operation must be different, as shown in FIGS. 12*b* and 12*c*. In practice, however, ONE's and ZERO's appear in indeterminate sequence, so that both portions of the first growing operations shown in FIG. 12*b* and 12*c* are necessary.

In FIG. 13, modification of the five-wire system of FIG. 8 is shown where an additional control wire 90, similar to that shown in FIG. 12 crosses the channel 31 of the data register 30 about midway between the lower and upper apices. The purpose of the added control wire 90 of FIG. 13 is the same as that of control wire 90 of FIG. 12.

Figure 13A:
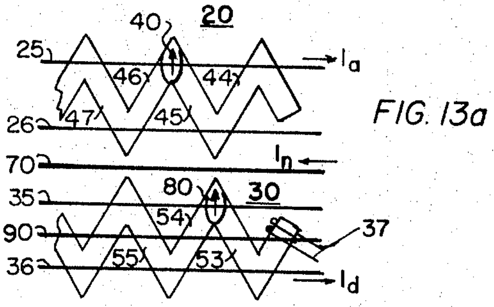
FIGS. 13*a*–13*f* are diagrams of the modified form of the device shown in FIG. 12 illustrating the write operation.

As shown in FIG. 13*a*, a marker bit 40 is shown in an upper apex of marker register 20 and the data bit is assumed to have been written into an upper apex of data register 30. This is the same condition illustrated in FIG.

8*a*. Assuming that one desires to write a ONE into the data register 30, the first growing operation is shown in FIGS. 13*b* and 13*c*, which contrasts with the single-step growing operation shown in FIG. 8*b*. In FIG. 13*b*, the control currents $I_a$ and $I_d$ are removed from control wires 25 and 36 and the current $I_n$ from control wire 70. A control current $I_p$ is supplied to control wire 90; this current $I_p$ inhibits growth of the domains 60*a* and 80*a* to the lower and upper apices terminating respective segments 56 and 54 of data register 30. This portion of the operation shown in FIG. 13*b* prevents reverse transfer of data domain 80*a* into the segment 44 of the marker register 20. During the second portion of the first growing operation, shown in FIG. 13*c*, the control current $I_p$ is removed from control wire 90 and the control current $I_n$ is supplied to control wire 70. The data domains 60*b* and 80*b* then continue to grow to the adjoining upper apices of data channel 31 shown in FIG. 13*b*. Note that, in FIG. 13*c*, the control current $I_c$ in control wire 35 must be applied at least slightly before removal of control current $I_c$ from control wire 90. In FIG. 13*d*, a shrinking magnetic field is applied and control currents $I_b$ and $I_c$ supplied to respective control wires 26 and 35, in addition to the currents supplied in FIG. 13*c*. The marker domain 40*c* shrinks to a lower apex of marker channel 21 terminating segment 46 of channel 21 and the data domains 60*c* and 80*c* are shrunk to the adjoining upper apices of data channel 31 terminating respective segments 56 and 54 of data register 30.

Figure 13E:
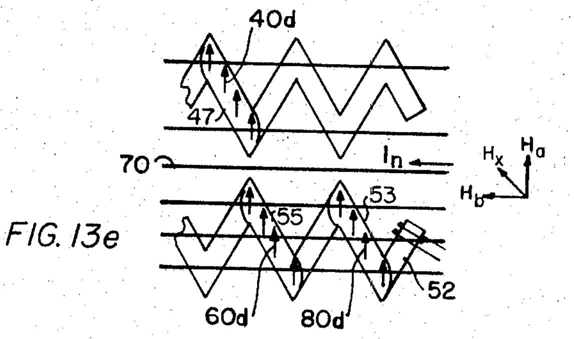
Figure 13B:
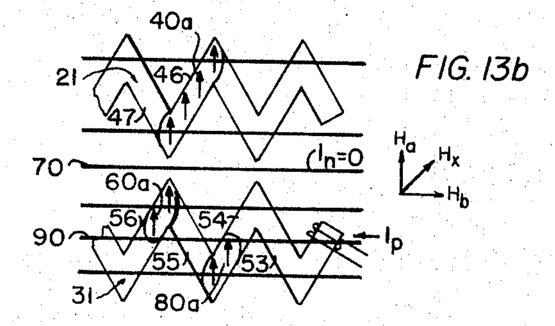
Figure 13F:
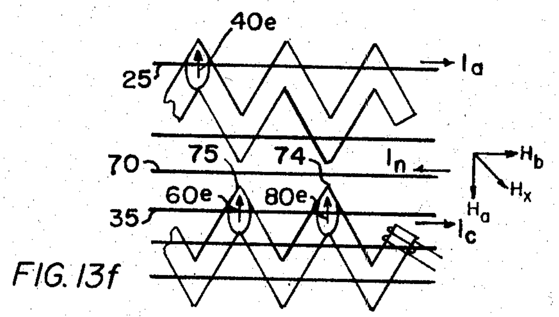
Figure 13C:
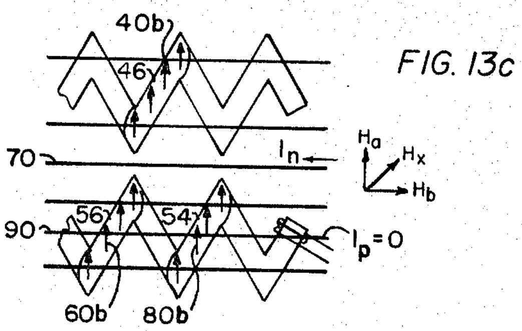
Figure 13D:
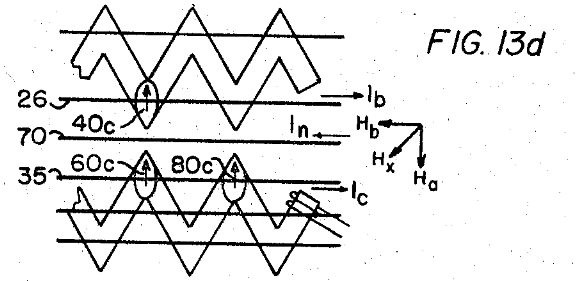

In the second growing step, shown in FIG. 13*e*, the marker domain 40*d* is grown along segment 47 of marker channel 21 and the data domains 60*d* and 80*d* are grown along respective segments 55 and 53 of data channel 31. In FIG. 13*e*, the holding currents $I_b$ and $I_c$ of FIG. 13*b* are removed from control wires 26 and 35. Finally, as shown in FIG. 13*f*, the marker domain 40*e* is shrunk to the upper apex 66 past which holding current $I_a$ flows and data domains 60*e* and 80*e* are shrunk to the upper apices 75 and 74 past which the holding current $I_c$ flows.

As stated in connection with the device shown in FIG. 12, if only ZERO's were to be written into the data register 30 the two separate portions of the growing operation, shown in FIGS. 13*b* and 13*c* could be identical, since the control current $I_n$ should flow through control wire 70 during both portions of this first growing operation. The current $I_p$ in control wire 90 then would be optional. However, in practice since ONE's and ZERO's occur in mixed sequence, the two portions of the first growing cycle are maintained for both ONE's and ZERO's.

What is claimed is:

1. A first-in, first-out memory including a marker shift register, a data shift register contiguous with said marker shift register, both of said shift registers having a plurality of discrete storage locations, said marker shift register containing a magnetic marker domain disposed therein at a controllable discrete storage location, means for moving said magnetic marker domain along said marker shift register in increments of one storage location, and means for writing data in the form of a magnetic domain into said data shift register at one discrete location thereof determined by the location in said marker shift register of said marker domain.

2. A first-in, first-out memory according to claim 1 further including means for reading data out of said data shift register from one discrete location thereof disposed at one end of said data shift register.

3. A first-in, first-out memory according to claim 1 wherein each of said shift registers are multi-segmented channels of magnetic material mounted directly upon a common magnetic medium of higher coercivity.

4. A first-in, first-out memory according to claim 1 wherein each of said shift registers includes a single saw-tooth-shaped channel of magnetic material consisting of a plurality of individual segments intersecting to form a series of adjoining upper and lower apices, a given segment of said marker shift register channel being aligned with and adjacent to a corresponding segment of said data shift register channel.

5. A first-in, first-out memory according to claim 2, wherein each of said registers includes a single multi-segmented channel of magnetic material of relatively low coercivity; said writing and reading means including current driver means, magnetic domain-controlling electrically conductive means and means for producing magnetic fields directed along the hard axis and easy axis of magnetization of said channel; said conductive means and said means for producing being selectively driven by said current driver means.

6. A first-in, first-out memory according to claim 2 wherein each of said registers includes a single multi-segmented channel of magnetic material of relatively low coercivity; said writing and reading means including current driver means, magnetic domain-controlling electrically conductive means and means for producing magnetic fields directed along the hard axis and easy axis of magnetization of said channel; said conductive means and said means for producing being selectively driven by said current driver means.

7. A first-in, first-out memory according to claim 5 wherein said means for writing includes means for growing said marker domain into said data register under control of said driver means to write a binary ONE into said data register.

8. A first-in, first-out memory according to claim 5 wherein said means for writing includes means for inhibiting growth of said marker domain into said data register under control of said driver means to write a binary ZERO into said data register.

9. A first-in, first-out memory according to claim 5 wherein each of said shift registers is traversed by a pair of said conductive means.

10. A first-in, first-out memory according to claim 9 wherein transfer of said marker domain into said data shift register is dependent upon the mode of driving one of said conductive means.

11. A first-in, first-out memory according to claim 9 further including a domain-controlling conductive means disposed between said data shift register and said marker shift register for controlling inter-register transfer of said marker domain.

12. A first-in, first-out memory according to claim 5 further including a domain-controlling electrically conductive member traversing said data shift register substantially along the longitudinal axis thereof for controlling inter-register transfer of said domains.

13. A first-in, first-out memory according to claim 12 further including a domain-controlling electrically conductive member disposed between said data shift register and said marker shift register for controlling inter-register transfer of said domains.

References Cited

UNITED STATES PATENTS

| | | | |
|---|---|---|---|
| 3,438,006 | 4/1969 | Spain | 340—174 |
| 3,113,297 | 12/1963 | Dietrich | 340—174 |
| 3,114,898 | 12/1963 | Fuller | 340—174 |
| 3,140,471 | 7/1964 | Fuller | 340—174 |
| 3,148,360 | 9/1964 | Hale | 340—174 |
| 3,212,070 | 10/1965 | Fuller et al. | 340—174 |

STANLEY M. URYNOWICZ, Jr., Primary Examiner